United States Patent [19]  [11] 4,123,691
Seilly  [45] Oct. 31, 1978

[54] ELECTROMAGNETIC DEVICES

[75] Inventor: Alec H. Seilly, North Wembley, England

[73] Assignee: Lucas Industries Limited, Birmingham, England

[21] Appl. No.: 826,755

[22] Filed: Aug. 22, 1977

Related U.S. Application Data

[63] Continuation-in-part of Ser. No. 701,342, Jun. 30, 1976, abandoned.

[30] Foreign Application Priority Data

Jul. 5, 1975 [GB] United Kingdom ............... 28435/75

[51] Int. Cl.² ........................................... H02K 33/00
[52] U.S. Cl. ..................................... 318/119; 310/27; 310/80; 335/220; 335/226
[58] Field of Search .................... 310/77, 80; 335/266, 335/220; 318/119, 129, 130, 128, 132

[56] References Cited

U.S. PATENT DOCUMENTS

| | | | |
|---|---|---|---|
| 3,353,040 | 11/1967 | Abbott | 310/27 |
| 3,447,052 | 5/1969 | Martin et al. | 318/132 X |
| 3,806,781 | 4/1974 | Berney | 318/130 |
| 3,932,792 | 1/1976 | Massie | 318/134 |
| 4,003,013 | 1/1977 | Seilly | 335/266 X |

Primary Examiner—Donovan F. Duggan

[57] ABSTRACT

An electromagnetic device comprises an annular stator and a movable armature having a cylindrical outer surface, located within the stator, the stator having a thread formation consisting of a pair of helical grooves and the armature having at least two thread formations each consisting of a pair of helical grooves of the thread formations being of the same helix angle, the thread formation on the stator having a winding set comprising windings in each of the grooves of the formation, the direction of current flow in the windings being in the opposite direction whereby when electric current is past through the windings relative movement of the stator and armature will take place to reduce the reluctance of the magnetic paths between the parts.

4 Claims, 9 Drawing Figures

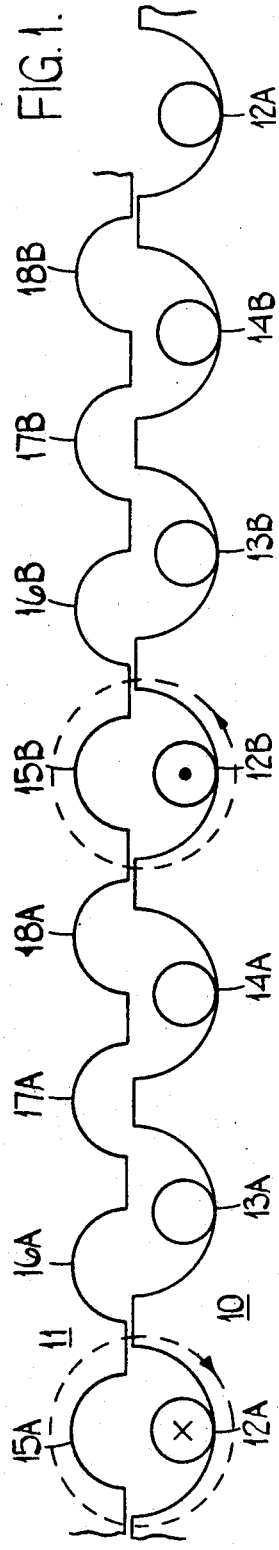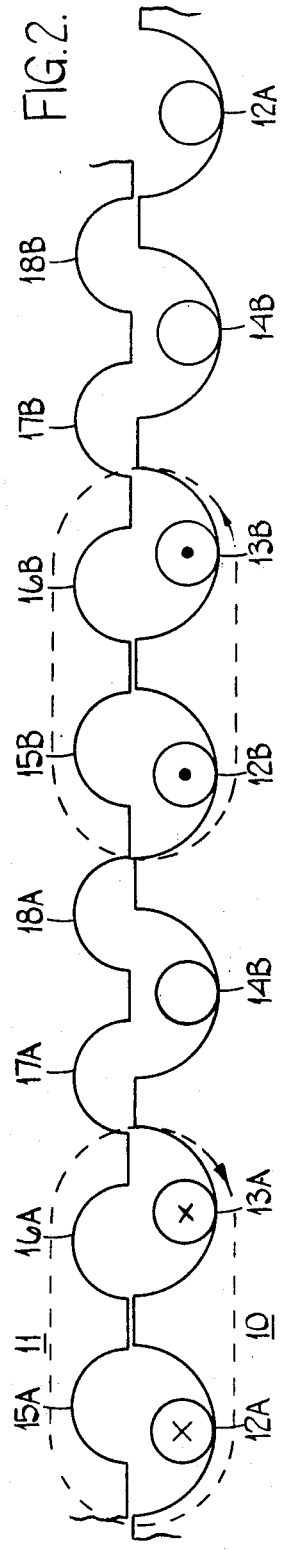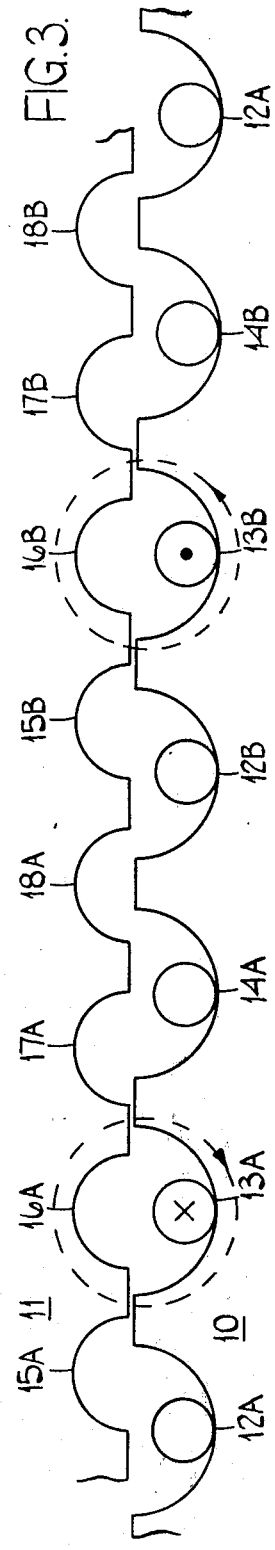

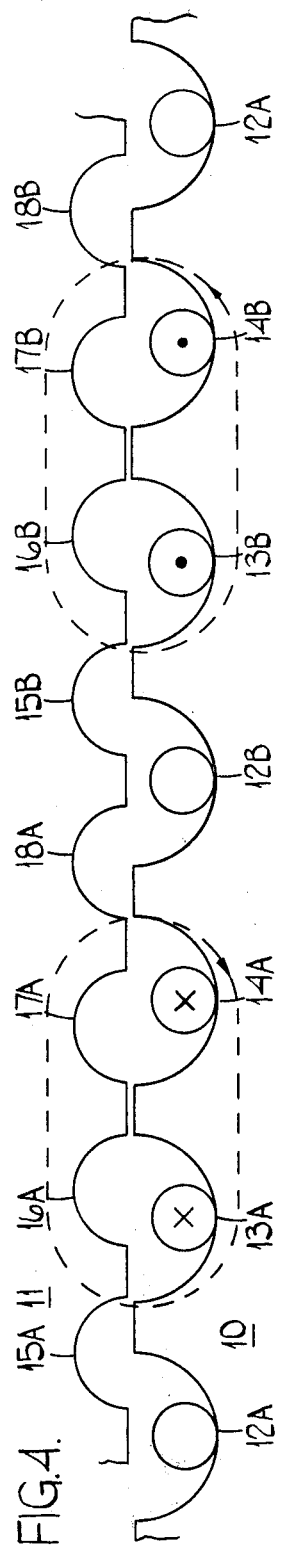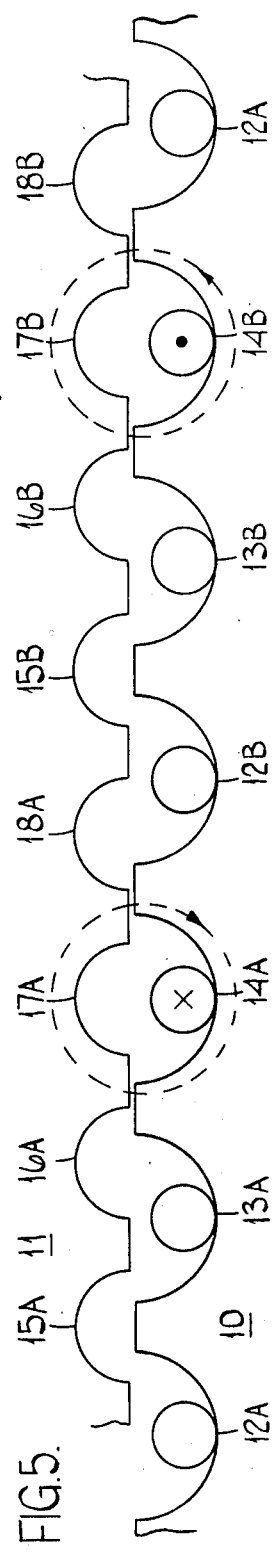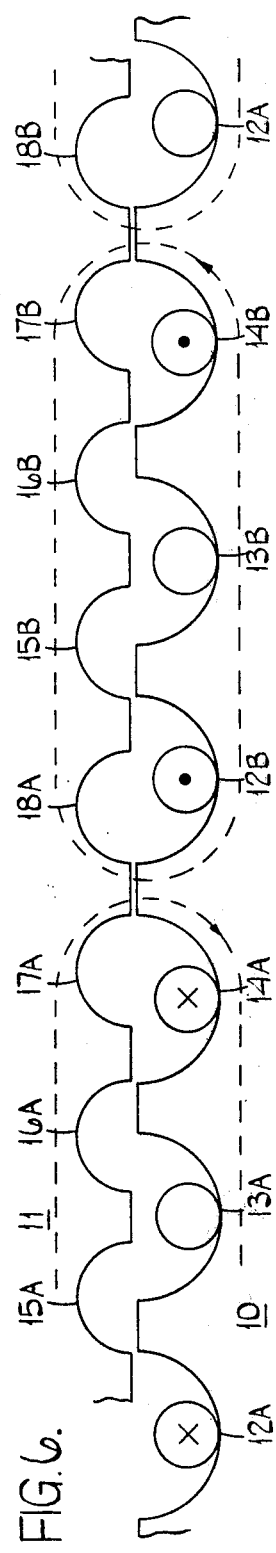

ELECTROMAGNETIC DEVICES

This application is a continuation in part application of my application Ser. No. 701342, now abandoned.

The invention relates to an electromagnetic device of the type generally described as a linear motor that is to say a device comprising a pair of relatively movable parts and a winding which when supplied with electric current, generates a magnetic field which results in a force tending to cause linear relative movement of the two parts.

In the specification of U.S. Pat. No. 4,003,013 there is described a device having helical windings which are located in helical grooves. The two members forming the device define helical interengaged ribs so that limited axial movement only can take place. In U.S. Pat. No. 3,353,040 there is described a similar device but in this case the ribs are not interengaged. However limited axial movement only can take place even when the direction of current flow is reversed.

It is an object of the present invention to provide a device of the nature described which can provide extended linear movement.

According to the invention the first of said parts defines a generally cylindrical working surface whilst the second part has a working surface presented to but spaced from the working surface of said first part, one of said parts having formed on its working surface at least one screw thread formation, the thread formation consisting of a pair of threads, a winding set associated with the thread formation, each winding set comprising windings located in said threads respectively and through which in use, electric current can be caused to flow in opposite directions, the working surface of the other of said parts having an extra number of thread formations with the threads of the formations having the same helix angles, whereby upon energisation of the windings the magnetic field produced by current flow in the windings will in certain relative positions of the parts, cause axial movement of the parts to effect an overall decrease in the reluctance of the magnetic paths between the parts and connection means whereby the current flow in the windings of the set can be periodically switched.

One example of a device in accordance with the invention will now be described with reference to the accompanying drawings in which:

FIGS. 1–7 show sectional views of the device in various operating settings;

Figure 7:
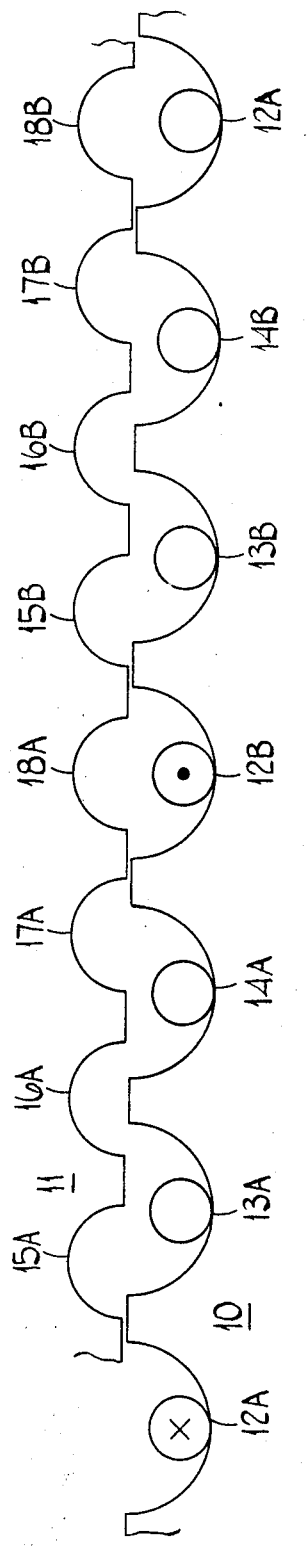
Figure 9:
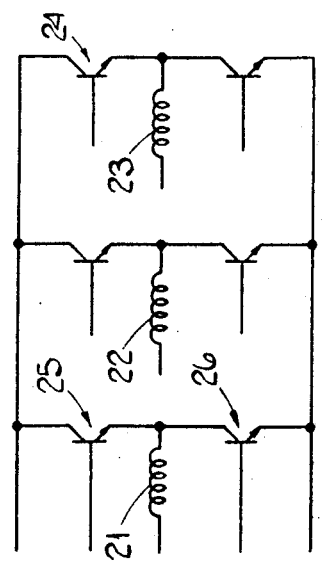
FIG. 9 shows a portion of the circuit diagram of a part seen in FIG. 8.

Referring to the drawings, the device comprises a first part 10 hereinafter called the stator and a second part 11 hereinafter called the armature. The stator 10 has a generally cylindrical outer surface and may be of annular construction. It is of course formed from magnetizable material. The armature 11 is of annular form and has an internal surface of generally cylindrical form which is presented to but spaced from the outer surface of the stator. The armature is also formed from magnetizable material.

Formed in the surface of the stator are three thread formations each of which consists of a pair of helical threads. The effect of this is to produce the equivalent of a threaded component having a six start thread. The two threads of each thread formation in the drawings are assigned the same numerals with the suffix letters A, B and the thread formations are numbered 12, 13 and 14.

Each thread of a thread formation accommodates a winding (shown as a single turn) and conveniently the winding of a particular formation extends in one direction along one of the threads from one end of the stator and returns towards the same end of the stator along the other thread of the formation. The two portions of the windings are thus connected in series so that current flows in the opposite directions therein. If the two portions of the winding are connected in parallel the connection is arranged so that the current flows are in the opposite direction.

The armature 11 has formed in its internal surface thread formations 15, 16, 17 and 18 and the individual threads of the formations on the stator and armature have the same helix angle. The same form of numbering system is applied as with the formations on the stator and it will be seen that for three formations on the stator there are four formations on the armature lettered A, B, C and D.

The windings of the thread formations are energised in turn although as will be seen from the drawings two sets of windings may be energised at the same time to improve the operation of the device.

One sequence of operation will now be described with reference to the Figures of the drawings. FIGS. 1 and 7 show equivalent positions with the exception that the two parts have moved through a distance equal to one thread on the stator 10. Moreover, the figures show the completion of the movement which occurs when the windings as shown in the individual figures have been energised.

FIG. 1 shows the position achieved by energising the windings in threads 12A and 12B, the cross and dot indicating the direction of current flow. In FIG. 1 the magnetic paths of the magnetic field produced by the current in the two windings has minimum reluctance but if FIG. 6 is considered it will be seen that with the windings in threads 12A and 12B only energised, the magnetic path does not exhibit minimum reluctance so that relative movement of the stator and armature occurs to the position of FIG. 1.

Relative movement of the stator and armature to the position of FIG. 2 is achieved by energising the windings in grooves 12A, 13A, 12B and 13B whilst the stator and armature are in the position of FIG. 1. Since the direction of current flow in the grooves 12A and 13A is in the same direction the main flux path extends around the two grooves and not in the crest between the grooves because the flux from the two windings is cancelled in the crest between the grooves.

Relative movement of the stator and armature to the position of FIG. 3 takes place when in the position of FIG. 2 the windings in thread grooves 13A and 13B only are energised. The flux pattern is the same as seen in FIG. 1.

Relative movement of the stator and armature to the position of FIG. 4 is achieved whilst the armature and stator are in the position of FIG. 3 by energising the windings in thread grooves 13A, 14A and 13B and 14B. The flux pattern corresponds with that of FIG. 2.

Relative movement of the armature and stator to the position of FIG. 5 is obtained by energising the windings in thread grooves 14A and 14B when the stator and armature are in the position shown in FIG. 4. The flux pattern obtained is the same as that of FIG. 1.

Relative movement of the armature and stator to the position in FIG. 6 is obtained by energising whilst the armature and stator are in the position of FIG. 5, the windings in thread grooves 12A, 12B and 13A, 13B. It will be noted that in this case the main flux path or paths is much longer but the two components are moved to the position shown. It will also be noted that the current flow in the windings in adjacent thread grooves 14A and 12B are in the opposite direction so that the magnetic flux in the intermediate crest is reinforced.

It will be understood that there are many other flux paths for the magnetic flux in each of the positions, in addition to the main paths shown. In each case the pulling effects of the other flux paths either cancel each other or are small as compared with the pulling effect produced by the main flux path.

For reverse movement of the windings are energised in the opposite sequence. Moreover, it is possible to hold the relative position of the armature and stator at any one of the positions by maintaining the appropriate windings energised. Furthermore, the strength of current flow in the windings may be controlled to obtain intermediate positions.

With the arrangement shown in the drawings, i.e. with three thread formations on the stator, the windings may be connected to a three phase alternating current supply without the provision of the switching network 20. If for example a five phase supply is utilized then five thread formations must be provided on the stator and six on the armature.

It will be understood that the sets of windings can be energised in other sequences in order to achieve relative movement of the members. In the sequence described above two winding sets only are energised at one time.

If the windings are connected to an AC supply then clearly there are times during which all the sets of windings will be energised and at all times at least two of the winding sets will be energised.

Figure 8:
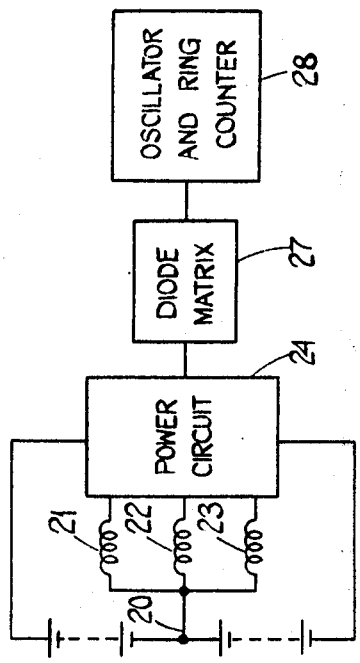
FIG. 8 shows a circuit diagram of the device.

The windings can be supplied from a DC supply utilizing the arrangement shown in FIG. 8. The DC supply is represented by a storage accumulator having a plurality of cells and provided with a centre tap 20 which is connected to one end of each winding set designated 21, 22, 23. The other ends of the winding sets are connected to a power circuit indicated at 24. The power circuit is a solid state device and associated with each winding is a pair of transistor switches diagrammatically shown at 25, 26. When the transistor switch 25 is conductive the associated winding is connected across the upper half of the accumulator and when the switch 26 is conductive the winding is connected across the lower half of the accumulator.

It will be understood that the switches 25, 26 will also include drive circuits well known in the art.

There are six switches to be controlled and for this purpose a diode matrix 27 is provided which ensures that at any one time the switches 25 and 26 associated with one winding will not be conductive at the same time and that the windings 21–23 receive a stepped and reversing DC supply the waveform of which can be compared with a sinusoidal waveform.

The diode matrix 27 is controlled by an oscillator and ring counter 28 both of which are well known in the art. The effect in that the current flow in each winding set is generally sinusoidal. When the windings are connected to the source of supply the armature will start to move as the waveform of the current in the windings attains the shape appropriate for the actual relative position of the armature and stator. The armature will then become locked to the supply.

I claim:

1. An electromagnetic device comprising a pair of relatively movable parts and a winding which when supplied with electric current generates a magnetic field which results in a force acting between the parts to cause linear relative movement of the parts, the first of said parts defining a generally cylindrical working surface whilst the second part has a working surface presented to but spaced from the working surface of said first part, one of said parts having formed on its working surface at least three screw thread formations, the thread formations each consisting of a pair of threads, winding sets associated with the thread formations respectively, each winding set comprising windings located in said threads respectively and through which in use, electric current can be caused to flow in opposite directions, the working surface of the other of said parts having one extra number of thread formations with the threads of the formations having the same helix angle, whereby upon energisation of the windings the magnetic field produced by current flow in the windings will cause axial movement of the parts to effect a decrease in the reluctance of the magnetic paths between the parts and connection means whereby the windings of the sets can be selectively energised to produce relative movement of said parts.

2. An electromagnetic device comprising a pair of relatively movable parts and a winding which when supplied with electric current generates a magnetic field which results in a force acting between the parts to cause linear relative movement of the parts, the first of said parts defining a generally cylindrical working surface whilst the second part has a working surface presented to but based from the working surface of said first part, one of said parts having formed on its working surface at least three screw thread formations, the thread formations each consisting of a pair of threads winding sets associated with the thread formations respectively, each winding set comprising windings located in said threads respectively and through which in use, electric current can be caused to flow in opposite directions, and the working surface of the other of said parts having one extra number of thread formations with the threads of the formations having the same helix angle, whereby upon energisation of the windings the magnetic field produced by current flow in the windings will cause axial movement of the parts to effect a decrease in the reluctance of the magnetic path between the parts and a switching network for selective energising said winding sets in sequence and for periodically reversing the current flow in the winding sets, said switching network including a power circuit having a pair of transistor switches operable to connect each winding to a positive and negative supply terminals respectively, a diode matrix operable to supply control pulses to said transistor switches whereby each winding will be connected to the positive and negative supply terminals in turn and a ring counter for controlling the operation of the diode matrix.

3. A device according to claim 2 including an oscillator for driving the ring counter.

4. A device according to claim 1 in which the windings of each winding set are connected in series.

* * * * *